United States Patent [19]
Frezzo et al.

[11] 3,743,117
[45] July 3, 1973

[54] APPARATUS FOR REMOVING COMPOST FROM MUSHROOM TRAYS

[75] Inventors: Guido Frezzo, Avondale; Thomas J. Placentino, Kennett Square, both of Pa.

[73] Assignee: Longwood Development Corp., Kennett Square, Pa.

[22] Filed: July 8, 1971

[21] Appl. No.: 160,768

[52] U.S. Cl. ......................................... 214/17 DA
[51] Int. Cl. ............................................ B65g 65/46
[58] Field of Search ............... 214/17 DA; 198/7 R, 198/9

[56] References Cited
UNITED STATES PATENTS

| | | | |
|---|---|---|---|
| 3,613,926 | 10/1971 | Scroggins | 214/17 DA X |
| 3,212,652 | 10/1965 | Roberts | 214/17 DA |
| 3,243,057 | 3/1966 | Kelling | 214/17 DA |

Primary Examiner—Robert G. Sheridan
Attorney—Louis V. Schiavo

[57] ABSTRACT

A non-dirigible frame of a width for extending across a mushroom tray is supported on the casing of a screw conveyor extending across the front of the frame and on a series of discs mounted upon a shaft extending across the rear of the frame. An electric motor and change speed means carried by the frame are operable for actuating the shaft and the discs mounted thereon, and for thereby advancing the machine. As the machine advances, the casing scrapes along the bottom of the tray. The electric motor and change speed means are also operable for actuating the screw, as a consequence of which the compost scraped up from the bottom of the tray and scooped into the casing is conveyed by the screw to one side of the tray for discharge therefrom.

6 Claims, 9 Drawing Figures

INVENTORS.
GUIDO FREZZO
THOMAS J. PIACENTINO

BY Louis V Schiavo
ATTORNEY.

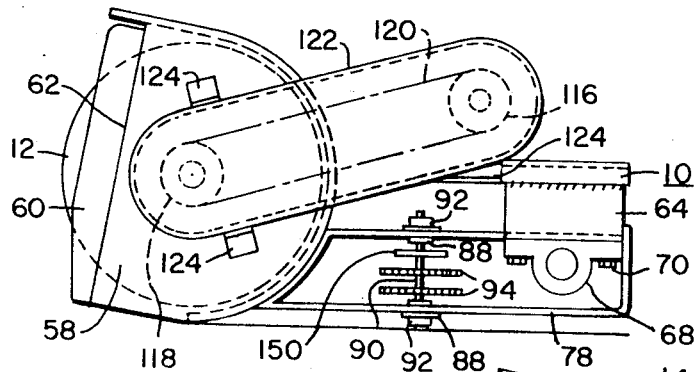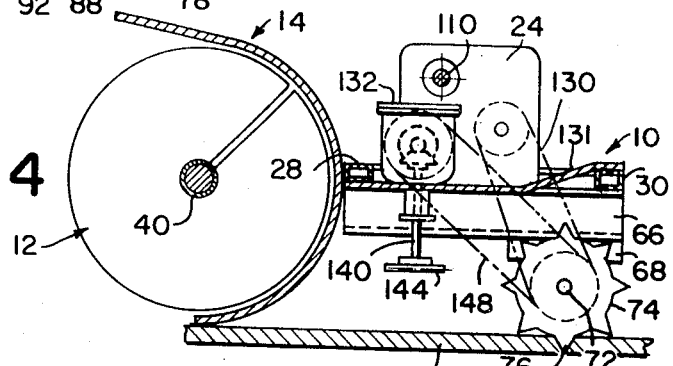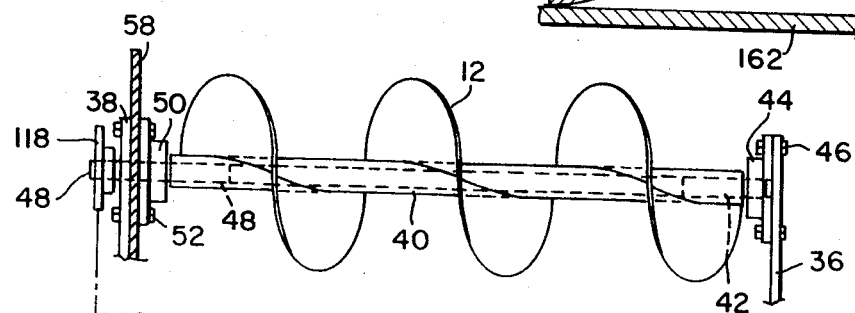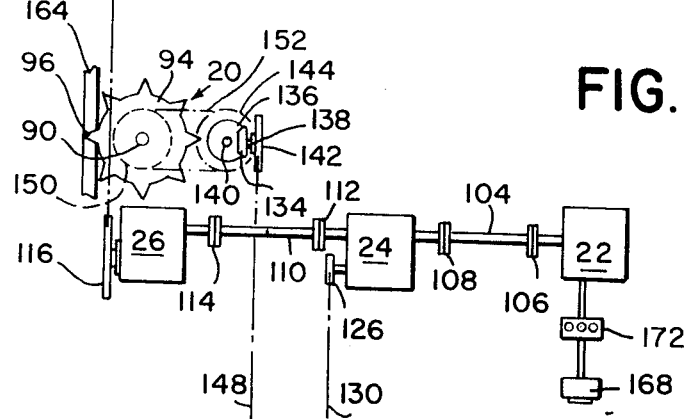

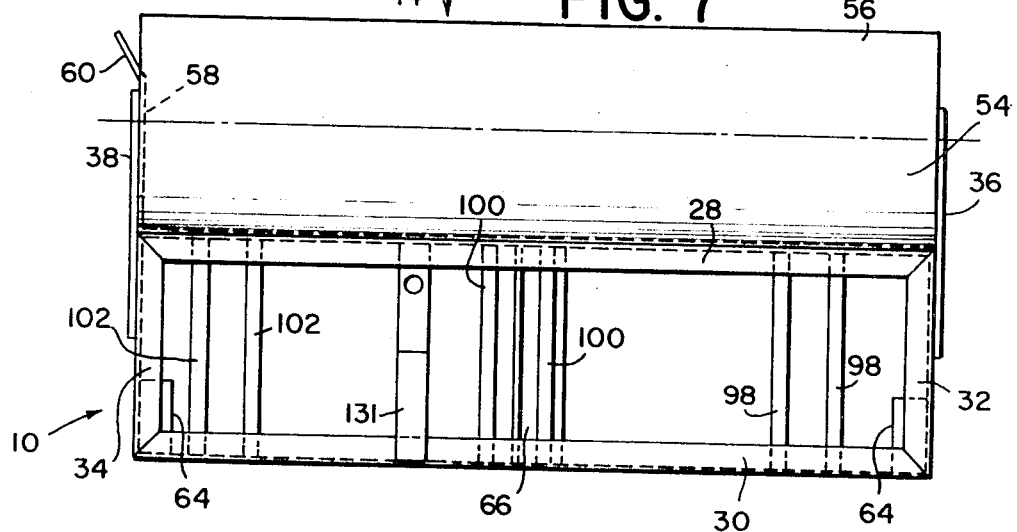
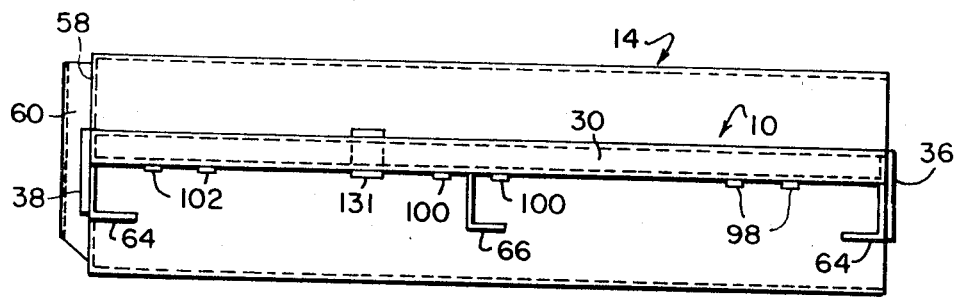
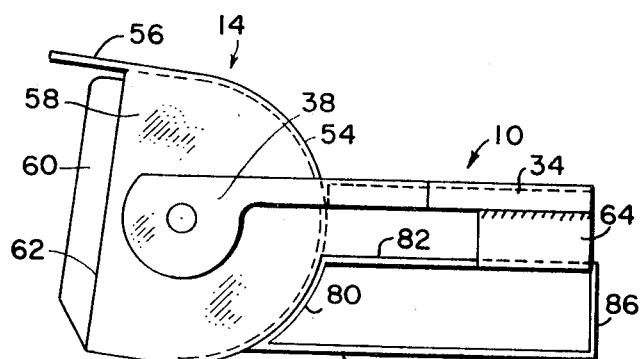
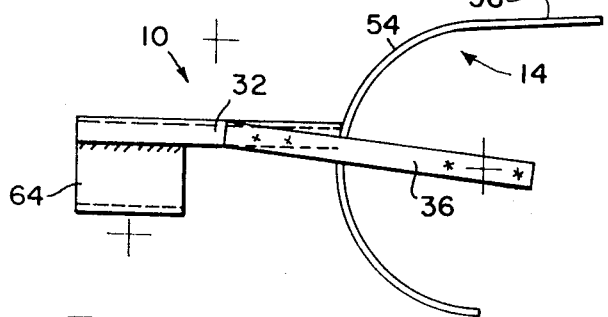

APPARATUS FOR REMOVING COMPOST FROM MUSHROOM TRAYS

BACKGROUND OF THE INVENTION

1. Field of the Invention

The trays which contain the beds of compost in which mushrooms are grown commercially are commonly arranged in tiers, with six vertically spaced trays to a tier. This invention relates to a power operated machine for removing the compost from such trays.

2. Description of the Prior Art

Mushrooms are grown commercially in beds of compost which when spent must be removed from the trays and replaced with fresh compost. Heretofore, removal of the spent compost from the trays has been effected by hand. Workmen shovel the spent compost from the trays, but they labor under conditions which make it difficult to reach the compost, the difficulty being that the trays of a tier thereof are vertically spaced about 22 inches apart and supported on bents horizontally spaced 48 inches apart. The work is not only difficult, but also time consuming and expensive. In addition, the work is performed by unskilled labor, which is not always available.

SUMMARY OF THE INVENTION

A principal object of the invention is to provide a power operated machine for traversing the length of a mushroom tray and removing the compost therefrom.

Another object of the invention is to provide such a machine with a screw conveyor which is advanced sidewise into the compost for biting into the same and conveying it to one side of the tray for discharge therefrom.

Still another object of the invention is to provide the conveyor with a casing effective for scraping the bottom of the tray as the machine advances thereover.

BRIEF DESCRIPTION OF THE DRAWINGS

FIG. 3 is a view looking at the left side of the machine;

FIG. 4 is an enlarged section on line IV—IV in FIG. 1;

FIG. 5 is a diagrammatic view showing generally how the moving parts of the machine are organized;

FIG. 6 is a rear view of the machine, but only the frame and the casing of the screw conveyor are shown;

FIG. 7 is a plan view of the frame and casing shown in FIG. 6;

FIG. 8 is a view looking at the left side of the frame and casing shown in FIG. 7; and FIG. 9 is a view looking at the right side of the frame and casing shown in FIG. 7.

DESCRIPTION OF THE PREFERRED EMBODIMENT

Figure 2:
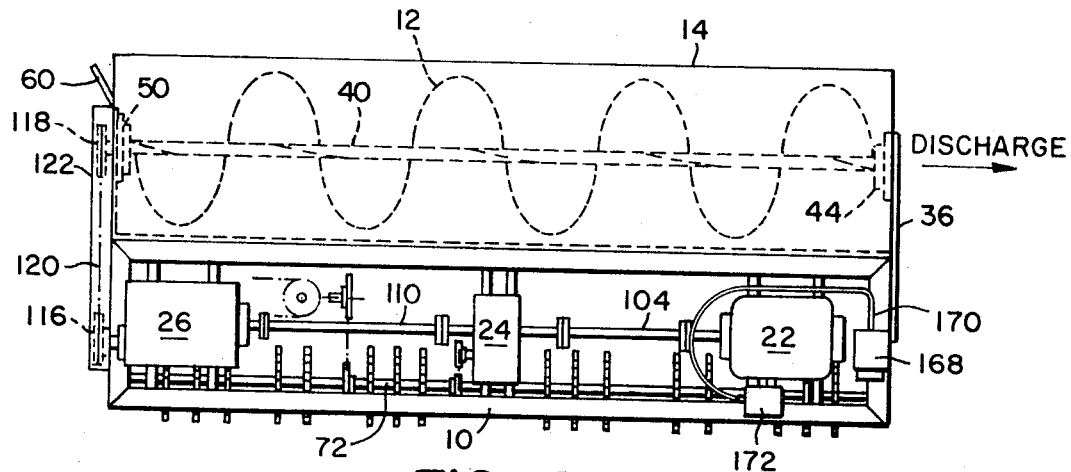
FIG. 2 is a plan view of the machine.

The following description is directed to the specific embodiment of the invention disclosed in the drawings. It is not addressed to the scope of the invention, which may be practiced in a variety of forms.

Referring to the drawings, a machine constructed in accordance with the invention comprises a rigid structural frame 10. A conveyor including a screw 12 and a casing 14 therefor extend across the front of the frame. A drive means is provided which includes a principal drive means 18 extending across the rear of the frame, and auxiliary drive means 20 extending vertically along one side of the frame, at the rear thereof. An electric motor 22 and change speed units 24 and 26 are mounted on the frame and operatively connected with the screw 12 and the drive means 18 and 20 for actuating the same.

The frame 10 is rectangular in shape and includes a pair of laterally spaced tubular members 28 and 30 extending horizontally respectively across the front and rear of the frame and a pair of laterally spaced angle iron members 32 and 34 extending horizontally respectively along the opposite sides of the frame. Affixed to the frame and extending forwardly therefrom, respectively from the opposite sides of the frame in laterally spaced parallel relation, are a pair of plates or arms respectively designated 36 and 38. The conveyor, comprising the screw 12 and the casing 14, is disposed between the arms 36 and 38.

The screw 12 is provided with a helical ribbon (preferably 12 inches in diameter) which spirals about a tubular core 40. A stub shaft 42 is telescoped into and affixed to one end of the core 40 and journalled in a bearing 44, secured by bolts 46 to the arm 36. Another stub shaft 48 is telescoped into and affixed to the other end of the core 40 and journalled in a bearing 50, secured by bolts 52 to the arm 38.

The casing 14 shrouds the full length of the screw 12, covering the back, top and one end thereof. The front and the other end of the screw 12 are not shrouded. The casing or shroud is provided with a part 54 disposed upright between the screw 12 and the frame 10, being affixed to the member 28, as by welding. In transverse section, the part 54 is semi-circular, the lower edge thereof being disposed directly below the central longitudinally extending axis of the screw, in lower spaced parallel relation thereto. The top of the part 54 terminates in a part 56 extending forwardly over the front of the screw 12, as shown. The end of the casing or shroud on the left side of the machine is provided with a cross-axially extending wall 58, the generally upright leading marginal area 60 of which is turned outwardly and forwardly on a bend line 62. The end wall 58 abuts the arm 38 and is interposed between the arm 38 and the bearing 50. The stub shaft 48 extends freely through the end wall 58 and the arm 38 for a purpose to appear.

Depending from the frame 10 are a pair of brackets 64 disposed respectively on opposite sides of the frame, at the rear thereof. Also depending from the frame is a bracket 66 disposed approximately midway between the brackets 64. The brackets carry bearings 68 secured by bolts 70. Journalled in the bearings is a shaft 72 which mounts a series of discs 74 provided with circumferentially spaced radially outwardly extending sharp, pointed teeth 76. Looking along the shaft 72, the teeth 76 of alternate discs 74 are staggered relative to the teeth 76 of intervening discs 74.

Referring particularly to FIG. 3, a bracket, generally designated 78, is provided with an intermediate part 80 fitted and secured, as by welding, to the back of the shroud 14. Extending rearwardly from the top of the part 80 is a part 82 welded to the associated bracket 64, and extending rearwardly from the bottom of the part 80 is a part 84 terminating in a part 86 turned upwardly and welded to the bracket 64. The parts 82 and 84 suitably mount bearings 88, which respectively receive the opposite end portions of a shaft 90 fitted with collars 92. The shaft mounts a pair of axially spaced discs 94 provided with circumferentially spaced radially outwardly extending sharp, pointed teeth 96. Looking along the shaft 90, the discs 94 are so arranged that the teeth 96 of one disc are staggered relative to the teeth 96 of the other disc.

The shaft 72 extending horizontally across the machine and the discs 74 mounted thereon constitute the principal drive means referred to hereinabove, and the shaft 90 extending vertically along one side of the machine and the discs 94 mounted thereon constitute the auxiliary drive means referred to hereinabove. The principal and auxiliary drive means together are referred to simply as the drive means.

The electric motor 22, change speed unit 24 and change speed unit 26 are mounted upon the bars 98, 100 and 102, respectively, secured as by welding to the underside of the frame members 28 and 30. A shaft 104 interposed between the output shaft of the motor 22 and the input shaft of the change speed unit 24 is suitably coupled, as at 106 and 108. Another shaft 110 interposed between one output shaft of the change speed unit 24 and the input shaft of the change speed unit 26 is suitably coupled, as at 112 and 114.

The change speed unit 26 is provided with an output shaft which mounts a chain sprocket 116, and the stub shaft 48 of the screw 12 mounts a chain sprocket 118. Trained over the sprockets 116 and 118 is an endless link chain belt 120 disposed close adjacent the outer side of the frame 10 and the arm 38 extending forwardly therefrom. A guard, generally designated 122, is disposed over the endless link chain belt 120, being secured by clips 124, as shown, to the end wall 58 of the casing 14 and the member 34 of the frame 10.

The change speed unit 24 is provided with a second output shaft, which mounts a chain sprocket 126, and the shaft 72 mounts a chain sprocket 128. Trained over the sprockets 126 and 128 is an endless link chain belt 130.

Spanning the frame members 28 and 30 and affixed thereto, as by welding, is a plate 131 which carries a casing 132 housing a pair of right angle bevel gears 134 and 136 respectively mounted on an input shaft 138 and an output shaft 140. The input shaft 138 also mounts a chain sprocket 142, and the output shaft also mounts a chain sprocket 144. Trained over the chain sprocket 142 and a chain sprocket 146 on the shaft 72 is an endless link chain belt 148, and trained over the chain sprocket 144 and a chain sprocket 150 on the shaft 90 is an endless link chain belt 152.

Figure 1:
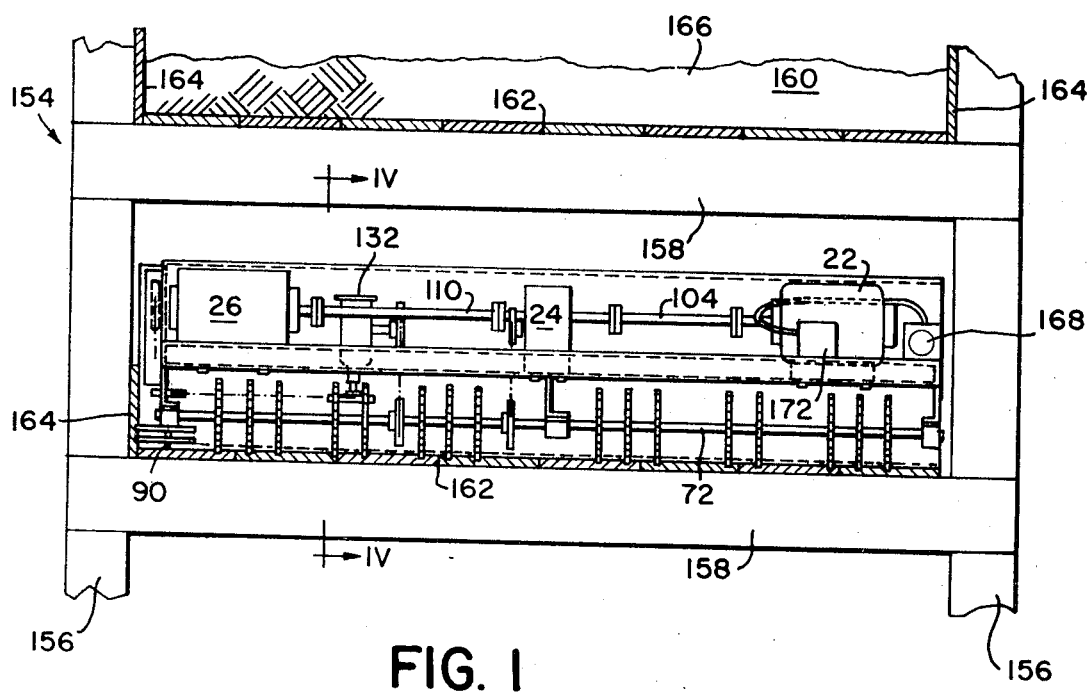
FIG. 1 is a rear view of a machine constructed in accordance with the invention. The machine is shown in working position extending across the bottom of a mushroom tray.

Referring particularly to FIG. 1, in a commercial mushroom house, the trays are supported on bents, generally designated 154, spaced approximately 48 inches apart. Each bent comprises a pair of laterally spaced posts 156 and vertically spaced cross members 158. At each level, the cross members 158 carry a tray approximately 60 inches wide and 6 inches deep, generally designated 160, comprising a bottom 162 and sides 164. The bottom and the sides of the tray consist of boards 6 inches wide loose in place. Each tray is filled with compost, designated 166, to about 1½ inches above its sideboards. The trays of a tier thereof are vertically spaced about 22 inches apart, as a consequence of which, at each bent, the headroom, i.e., the distance from the bottom of a tray to the bottom of the cross members supporting the next highest tray is about 15 inches. A machine constructed in accordance with the present invention may be sufficiently compact for operation in the environment just described.

In the use of a machine embodying the present invention, one of the sideboards of the tray which is to be unloaded is removed. Then, at one end of the tray, sufficient compost is removed to make room for the machine, which is placed across the tray with the screw 12 leading. The front of the machine is supported on the casing 14, and the rear of the machine is supported on the discs 74 carried by the shaft 72. The leading edge of the area 60 of the end wall 58 of the casing 14 and the discs 94 carried by the shaft 90 engage the associated sideboard 164 of the tray 160.

A cable (not shown) connected to a source of electric power and played out as the machine advances is plugged into a suitable receptacle 168 mounted on the frame 10 and connected through a cable 170 and a three position on-off reversing switch 172 in electric circuit with the electric motor 22. When the switch is thrown from its off position to a first position, the electric motor, through the change speed units 24 and 26 and the endless link chain belts 120 and 130, actuates the shaft 72 and the screw 12. At the same time, the shaft 72, through the endless link chain belts 148 and 152 actuates the shaft 90. As a consequence, the several discs 74 bite into the bottom boards of the tray and the discs 94 bite into the associated sideboard of the tray for the traction necessary to advance the machine. As the machine advances, the lower edge of the casing 14 scrapes the bottom of the tray, and the front of the screw 12 bites into the compost. The compost is scooped up into the casing 14, whereupon the screw 12 conveys it to the right for discharge thereof directly from the bottom of the tray. As the machine advances, compost may tend to pack between the discs 94. If desired, a scraper (not shown) may be mounted on the frame 10 and arranged for dislodging the packed compost.

Preferably, the electric motor 22 is a 2 horsepower, 1,750 r.p.m., three phase, drip-proof motor. The units 24 and 26 are Boston Gear Boxes with ratios of 200:1 and 9.364:1, respectively. The chain sprockets 126 and 128 have 14 and 28 teeth respectively so that the shaft 72 makes 4.4 r.p.m. The chain sprockets 142, 144, 146 and 150 each have 14 teeth, and the gears 134 and 136 have the same number of teeth. Accordingly, the shaft 90 also makes 4.4 r.p.m. The discs 74 and 94 are the same size, as a consequence of which the rate of travel of the discs 94 along the sideboard is the same as the rate of travel of the discs 74 along the bottom of the tray. Preferably, the machine moves forward at the rate of approximately 6 feet per minute. The chain sprockets 116 and 118 each have 28 teeth, as a consequence of which the screw 12 makes 185 r.p.m. As the screw pushes the compost to the right of the machine, there is a reaction toward the left of the machine, as a consequence of which the machine is urged to the left and the teeth 96 of the discs 94 bite into the sideboard for traction.

In the event that it becomes necessary to back the machine away from the compost, the switch 168 is thrown from the first position thereof, through the off position, into the other position thereof, whereupon the machine is thrown into reverse. When the machine is free again, the switch 168 is again thrown to the position for advancing the machine.

While in accordance with the patent statutes, we have illustrated and described the best form of the embodiment of our invention known to us, it will be apparent to those skilled in the art that changes may be made in the form of the machine described without departing from the spirit and scope of the invention as set forth in the appended claims, and that in some cases certain features of our invention may be used to advantage without a corresponding use of other features.

What is claimed is:

1. In a power operated machine for traversing the length of a mushroom tray and removing the compost therefrom, the combination comprising
    A. a frame of a width for extending across said tray,
    B. a screw conveyor extending across the front of said frame including
        1. a screw having a core revolvably mounted in said frame and helical ribbon spiralling about said core, and
        2. a casing extending over the back and top of said screw for shrouding the same and arranged for engaging the bottom of said tray and thereby supporting the front of said frame,
    C. drive means revolvably mounted on said frame including
        1. principal drive means extending across the rear of said frame and arranged for engaging the bottom of said tray and thereby supporting the rear of said frame, said principal drive means being operable for advancing said machine, whereupon said casing scrapes the bottom of said tray and the unshrouded front of said screw is urged into the compost, and
        2. auxiliary drive means arranged for directly engaging the side of said tray and operable for coacting with the principle drive means to advance said machine,
    D. an electric motor,
    E. change speed means, said motor and change speed means being mounted upon said frame, and
    F. means operatively connecting said change speed means with said screw and with said principal and auxiliary drive means for actuating the same.

2. In a power operated machine for traversing the length of a mushroom tray and removing the compost therefrom the combination comprising
    A. a frame of a width for extending across said tray,
    B. a screw conveyor extending across the front of said frame including
        1. a screw having a core revolvably mounted in said frame and a helical ribbon spiraling about said core, and
        2. a casing extending over the back and top of said screw for shrouding the same and arranged for engaging the bottom of said tray and thereby supporting the front of said frame,
    C. drive means revolvably mounted upon said frame including
        1. principal drive means including
            a. a shaft extending across the rear of said frame,
            b. a plurality of disc members axially spaced along said shaft, and
            c. pointed elements circumferentially spaced about said disc members and extending radially outwardly therefrom for effectively gripping the bottom of said tray successively as they present downwardly, said principal drive means being operable for advancing said machine, whereupon said casing scrapes the bottom of said tray and the unshrouded front of said screw is urged into the compost, and
        2. auxiliary drive means including
            a. a shaft extending upright along one side of said machine,
            b. a plurality of disc members axially spaced along said shaft, and
            c. pointed elements circumferentially spaced about said disc members and extending radially outwardly therefrom for effectively gripping the side of said tray successively as they present outwardly from the side of said machine, said auxiliary drive means being operable for coacting with said principal drive means to advance said machine,
    D. an electric motor,
    E. change speed means, said motor and change speed means being mounted upon said frame, and
    F. means operatively connecting said change speed means with said screw and with said principal and auxiliary drive means for actuating the same.

3. The combination according to claim 2 wherein the principal drive means is disposed under the frame, and the auxiliary drive means is disposed between the casing and the principal drive means.

4. The combination according to claim 2 wherein the change speed means includes two units connected serially with the electric motor, one of said units and the screw are connected by a first endless link chain drive, the other of said units and the principal drive means are connected by a second endless link chain drive, and the principal and auxiliary drive means are connected by means including other endless link chain drives.

5. The combination according to claim 4 wherein the electric motor is disposed on the discharge side of the machine, the first endless link chain drive and the auxiliary drive means are disposed on the opposite side of the machine, and the second endless link chain drive is disposed intermediate the opposite sides of the machine.

6. The combination according to claim 4 wherein the means connecting the principal and auxiliary drive means includes gear means for converting rotation about a horizontal axis to rotation about a vertical axis, an endless link chain drive from the principal drive means to the input of said gear means, and an endless chain drive from the output of said gear means to said auxiliary drive means.

* * * * *